US012116092B2

(12) United States Patent
Pedersen

(10) Patent No.: US 12,116,092 B2
(45) Date of Patent: Oct. 15, 2024

(54) DYNAMIC POSITIONING CONTROL

(71) Applicant: NOBLE DRILLING A/S, Kgs. Lyngby (DK)

(72) Inventor: John Røn Pedersen, Frederikssund (DK)

(73) Assignee: NOBLE DRILLING A/S, Kgs. Lyngby (DK)

( * ) Notice: Subject to any disclaimer, the term of this patent is extended or adjusted under 35 U.S.C. 154(b) by 0 days.

(21) Appl. No.: 16/645,602

(22) PCT Filed: Sep. 10, 2018

(86) PCT No.: PCT/DK2018/000094
§ 371 (c)(1),
(2) Date: Mar. 9, 2020

(87) PCT Pub. No.: WO2019/048013
PCT Pub. Date: Mar. 14, 2019

(65) Prior Publication Data
US 2020/0277031 A1 Sep. 3, 2020

(30) Foreign Application Priority Data

Sep. 8, 2017 (GB) ........................................ 1714526
Sep. 13, 2017 (DK) ........................... PA 2017 00503

(51) Int. Cl.
*B63B 79/40* (2020.01)
*B63B 35/44* (2006.01)
(Continued)

(52) U.S. Cl.
CPC .......... *B63B 79/40* (2020.01); *B63B 35/4413* (2013.01); *B63H 25/46* (2013.01);
(Continued)

(58) Field of Classification Search
CPC ................ B63B 79/40; B63B 35/4413; B63B 2035/448; E21B 47/007; E21B 17/01; E21B 19/004; E21B 41/0007; G05D 1/0208
(Continued)

(56) References Cited

U.S. PATENT DOCUMENTS 3,730,126 A * 5/1973 Zunderdorp .............. G01S 1/02
114/144 B
4,205,379 A * 5/1980 Fox ..................... E21B 41/0014
701/116
(Continued)

FOREIGN PATENT DOCUMENTS

CN 103970021 A 8/2014
KR 10-2013-0114513 10/2013
(Continued)

OTHER PUBLICATIONS

International Patent Application No. PCT/DK2018/000094, International Search Report and Written Opinion dated Nov. 21, 2018, 11 pgs.
(Continued)

*Primary Examiner* — Christine M Mills
*Assistant Examiner* — Patrick F Lambe
(74) *Attorney, Agent, or Firm* — Cozen O'Connor

(57) ABSTRACT

A controller for a dynamic positioning system, the controller being configured to determine a position of a vessel relative to a target position and to control a propulsion system of the vessel based on the determined position of the vessel relative to the target position, wherein the controller is configured to monitor a property of at least part of a riser; and adjust the control of the propulsion system accordingly.

21 Claims, 5 Drawing Sheets

(51) Int. Cl.
  *B63H 25/46* (2006.01)
  *E21B 17/01* (2006.01)
  *E21B 19/00* (2006.01)
  *E21B 41/00* (2006.01)
  *E21B 47/007* (2012.01)
  *G05D 1/00* (2006.01)

(52) U.S. Cl.
  CPC ............ *E21B 17/01* (2013.01); *E21B 19/004* (2013.01); *E21B 41/0007* (2013.01); *E21B 47/007* (2020.05); *G05D 1/0208* (2013.01); *B63B 2035/448* (2013.01)

(58) Field of Classification Search
  USPC .......................................................... 701/21
  See application file for complete search history.

(56) References Cited

U.S. PATENT DOCUMENTS

| | | | |
|---|---|---|---|
| 4,301,760 A | 11/1981 | Cassone et al. | |
| 4,317,174 A | 2/1982 | Dean | |
| 5,978,739 A * | 11/1999 | Stockton | E21B 47/001 |
| | | | 702/6 |
| 6,278,937 B1 * | 8/2001 | Ishida | E21B 47/001 |
| | | | 701/1 |
| 6,485,343 B1 * | 11/2002 | B.o slashed.rseth | B63H 25/42 |
| | | | 441/4 |
| 9,868,501 B1 * | 1/2018 | Gable | B63H 21/213 |
| 2006/0065401 A1 | 3/2006 | Allen et al. | |
| 2008/0314597 A1 | 12/2008 | Sbordone et al. | |
| 2016/0264143 A1 | 9/2016 | Martin et al. | |
| 2018/0364718 A1 * | 12/2018 | Gundersen | B63J 99/00 |

FOREIGN PATENT DOCUMENTS

| | | |
|---|---|---|
| KR | 10-1517440 B1 | 5/2015 |
| KR | 10-2016-0003037 | 6/2020 |
| WO | WO 2016/145398 A1 | 9/2016 |

OTHER PUBLICATIONS

Danish Patent Application No. PA 2017 00503; Search Report completed Feb. 7, 2018; 4 pgs.

Singapore Patent Application No. 11202001622Y, Invitation to Respond to Written Opinion, Written Opinion and Search Report dated Mar. 23, 2021, 8 pages.

English Translation of CN 103970021 A dated Aug. 6, 2014, 15 pages.

Korean Patent Application No. 10-2020-7006638; Notice of Office Action dated Dec. 28, 2022; 22 pages.

* cited by examiner

DYNAMIC POSITIONING CONTROL

CROSS-REFERENCE TO RELATED APPLICATIONS

This application is a 35 U.S.C. § 371 filing of International Application No. PCT/DK2018/000094 filed Sep. 10, 2018, which claims the benefit of priority to Great Britain Application No. GB1714526.9, filed Sep. 8, 2017, and Danish Patent Application No. PA 2017 00503 filed Sep. 13, 2017, each of which is incorporated herein by reference in its entirety.

FIELD

The present disclosure relates to a controller for a dynamic positioning system, a dynamic positioning system and methods of dynamic positioning.

BACKGROUND

Dynamic positioning is used in the offshore oil and gas industry for the station-keeping of vessels, such as drill ships, semi-submersibles, FPSOs and the like. Such vessels may perform operations (e.g., drilling) which require infrastructure, such as risers, to extend from the vessel to a fixed subsea location, such as a wellhead location. Any undesired deviation of the vessel, which may be caused by wave, wind and current interactions, may cause undesirable stresses and strains to develop in the infrastructure extending from the vessel, presenting personnel and environmental safety issues.

Dynamic positioning involves computer based control of a vessel's position and typically includes a controller which determines the position of the vessel relative to a target position and then operates a vessel propulsion system, usually including multiple thrusters, as required, to maintain the vessel in the target position. The position of the vessel can be determined using any of a range of position determination sensors.

However, even though modern position determination sensors can be reliable and accurate, any errors in the position determination sensors may result in unwanted operation of the vessel's propulsion system. This could result in a "drive off" situation where the propulsion system moves the vessel away from the target position under power, rather than maintaining the target position.

SUMMARY

A first aspect of the present disclosure relates to a controller for a dynamic positioning system, the controller or dynamic positioning system being configured to determine a position of a vessel relative to a target position and to control a propulsion system of the vessel based on the determined position of the vessel relative to the target position, wherein the controller is configured to monitor a property of a riser extending from the vessel and to adjust the control of the propulsion system accordingly wherein the controller is configured to adjust control of the propulsion system by limiting a power characteristic of the propulsion system.

The ability to adjust the control of the propulsion system in accordance with the monitored property of the riser may facilitate improvements in addressing unrequired vessel movements (e.g. drive-off) based on false or inaccurate vessel position data. For example, the controller monitors the property of the riser and this may contradict a determined position of the vessel. If so, then the system may be configured to adjust the control of the propulsion system in accordance with the monitored the property of the riser. As such, the monitored property of the riser is not used as a position determination per se, but a check to ensure that the control of the propulsion system based on the determined position is correct. By limiting a power characteristic of the propulsion system the limitation may be imposed without otherwise influencing the often complex control methodology of the dynamic positioning system. In this way additional protection against drive off may be implemented in robust manner without retesting the logic of such control methodology.

The propulsion system may comprise one or more thrusters of the vessel. The propulsion system may comprise a system specifically for repositioning the vessel. The propulsion system may be separate from a primary drive system of the vessel.

The controller may be configured to adjust the control of the propulsion system according to the monitored property of the riser in a way that results in a time delay to fully implement any change in operation of the propulsion system which would seek to alter the position of the vessel. Such a time delay may provide an operator with a sufficient time or opportunity to react or intervene if required.

The controller may be configured to adjust the control of the propulsion system by restricting an operation of the propulsion system according to the monitored property of the riser. The controller may be configured to adjust control of the propulsion system by limiting a power characteristic of the propulsion system, e.g. to below a limit. The power characteristic may comprise at least one of: a power demand, a rate of increase in power demand, power consumption, a rate of increase in power consumption, a power output, and/or a rate of increase in power output, of the propulsion system. The limitation of the power characteristic may comprise a hard limitation (e.g. if the power characteristic is the power demand, consumption or output of the propulsion system).

The limitation of the power characteristic may comprise a soft limitation (e.g. if the power characteristic is the rate of increase in power demand, consumption or output of the propulsion system). The limiting of the power characteristic of the propulsion system may comprise a limitation of the characteristic of the propulsion system determined based on the position of the vessel relative to the target position.

The controller may be configured to set and/or dynamically adjust the limit. The controller may be configured to set and/or dynamically adjust the limit based on power consumption or output of the propulsion system. The controller may be configured to set and/or dynamically adjust the limit based on average power consumption or output of the propulsion system or a range of variation in power consumption or output during normal operation of the dynamic positioning system. For example, The controller may be configured to set and/or dynamically adjust the limit to be greater than the average power consumption or output of the propulsion system or greater than a majority or all of a range of variation in power consumption or output during normal operation of the dynamic positioning system.

By limiting a rate of increase of the power consumption of the propulsion system any operation of the propulsion system determined by the system based on the comparison of the determined position of the vessel with the target position may still occur, it is just that the full implementation of the operation may be delayed or slowed down, thereby allowing an operator more time to make a manual intervention in the case of an incorrect operation but without preventing any necessary operations from occurring.

The controller may be configured to adjust the control of the propulsion system when the one or more properties of the riser meet one or more criteria. The one or more criteria may comprise the property of the riser being below an associated threshold or within an operational range. The one or more criteria may comprise the property of the riser being below an associated threshold or within an operational range for a period of time. The period of time may be predetermined or determined, e.g. based on pervious "normal" operation of the vessel. The controller may be configured to control the propulsion system of the vessel based on the determined position of the vessel relative to the target position without further limiting or adjustment of the power characteristic if the property of the riser is below the associated threshold or within the operational range.

In this way, the controller may be configured to potentially limit the power characteristic if the property of the riser is within the threshold or operational limit (i.e. the riser is in a condition associated with the vessel being in the target position) but to revert to standard control based on determined position without the possibility of additional limitation if the property of the riser is outwith the threshold or operational range (i.e. the riser is in a condition associated with the vessel being away from the target position). This may reduce the likelihood of the controller preventing a justified operation to return the vessel to the target position. The controller may adjust the control of the propulsion system based on at least the monitored property as a default and may revert to standard control when the property of the riser is outwith the threshold or operational range (i.e. default on). Alternatively, the controller may perfrom standard control when the property of the riser is outwith the threshold or operational range as a default and adjust the control of the propulsion system based on at least the monitored property when the property of the riser is within the threshold or operational range (i.e. default off). The controller may be configured to set or vary the threshold or operational range in use, e.g. according to a vessel current. The controller may be configured to increase the associated threshold or operational range when the vessel current increases or is above a current threshold.

The controller may be configured to adjust control of the propulsion system by limiting the power characteristic of the propulsion system if a power criterion of the propulsion system is above a power threshold. The power criterion may comprise at least one of: the power demand or a rate of increase in power demand of the propulsion system, power consumed by the propulsion system, a rate of increase in the power consumed by the system, the power output by the propulsion system, the rate of increase in power output by the propulsion system and/or the like. The power threshold may be a hard threshold (e.g. when the criterion is the power demanded, consumed or output by the system). The power threshold may be a soft threshold (e.g. when the criterion is a rate of increase in the power demanded, consumed or output by the system). The controller may be configured to control the propulsion system of the vessel based on the determined position of the vessel relative to the target position without further limiting the power characteristic if the power demanded or consumed by the propulsion system is below the power threshold. The power threshold may be dynamically adjustable by the controller. The controller may be configured to adjust the power threshold depending on the power demand or consumption or output of the propulsion system. The controller may be configured to adjust the power threshold depending on the vessel current. The vessel current may comprise a sum of forces experienced by the vessel mins any wind forces. The controller may be configured to increase the power threshold when the vessel current increases or is above a current threshold. The controller may be configured to set the power threshold to be a function of the average power demanded, consumed or output by the propulsion system. The controller may be configured to set the power threshold to be greater than the average power demanded, consumed or output by the propulsion system.

In this way, the controller may allow normal low power operations that would be routinely expected in order to maintain the vessel position, e.g. to counteract currents, wind and the like, without the limitation of the power characteristic being applied and may only apply the limitation to higher power operation of the propulsion system, as typically occurs when dynamic position is based on erroneous position sensor data.

The property of the riser may be determined or monitored by a riser management system, which may communicate the value of the property of the riser to the controller.

The monitored property of the riser may be or comprise the inclination of at least part of the riser. The inclination of the riser may be measured by at least one tilt sensor provided on the riser. The tilt sensor may comprise an accelerometer, a gyroscopic sensor, a force balance sensor, a piezo stack sensor, a MEMS tilt sensor, an electrolytic tilt sensor, a capacitive tilt sensor, and/or the like. The at least part of the riser may be or comprise a flex joint. The inclination may be an inclination of the flex joint.

The one or more properties of the riser supported by the vessel may be or comprise an angle, orientation, bending, flex, stress or strain of at least part or all of the riser.

The controller may be configured to determine if the monitored property of the riser (e.g. inclination) is above a disconnection threshold. The controller may be configured to automatically disconnect the riser, and/or provide an alert to an operator to disconnect the riser, if the monitored property of the riser exceeds the disconnection threshold. The disconnection of the riser may be an emergency disconnect of the riser (EDS).

The disconnection threshold may be higher than the threshold and/or outwith the operational range, but optionally need not be. This may allow the problem to be solved by adjusting control of the propulsion system in the first instance before the riser is disconnected.

The disconnection threshold may be below a maximum value of the monitored property at which disconnection of the riser can occur. For example, the disconnection threshold may be at least 1° but less than 6° inclination of the riser. The disconnection threshold may be less than the maximum value of the monitored property at which disconnection of the riser can occur by at least an operational margin, e.g. by at least 3°, 4° or 5°. The operational margin may allow time for the riser to be disconnected before the maximum value of the monitored property at which disconnection of the riser can occur is reached.

The controller may be configured to set or dynamically adjust at least one of: the power threshold, the disconnection threshold and/or the limit on the power characteristic at least partially based on a model of the vessel's response to power. The model may translate between movement of the vessel and power demand or consumption of the propulsion system.

The controller may be configured to set or dynamically adjust at least one of: the power threshold, the disconnection threshold and/or the limit on the power characteristic at least partially based on a drift off calculation (e.g. a time to reach a maximum value of the monitored property in the event of a complete black out or failure of the dynamic positioning system). The drift off calculation may be determined by the controller or determined by the dynamic positioning system of the vessel and communicated to the controller. The drift off calculation may be calculated continuously or at regular intervals.

The controller may be configured to set or dynamically adjust at least one of: the power threshold, the disconnection threshold and/or the limit on the power characteristic at least partially based on direction of the thrusters and/or weather data.

The riser may be a drilling riser, production riser, and/or the like. The riser may extend from the vessel into the sea to a fixed location, such as a wellhead location, BOP, manifold, Xmas tree, and/or the like. The riser may be a riser being handled, moved, supported, and/or attached to the vessel.

The controller may be configured to determine and/or receive one or more signals representative of the property of the riser. The one or more signals may comprise signals from one or more control sensors, which may be configured to monitor, measure or determine the property of the riser. The one or more control sensors may be provided on the riser. The one or more control sensors may comprise one or more inclinometers, accelerometers, stress gauges, strain gauges, tilt sensor, and/or the like.

The control sensors may comprise at least two duplicate sensors, which may be control sensors of the same type and/or which may monitor the same property of the same part of the riser. The controller may be configured to adjust the control of the propulsion system on the basis of signals from at least two or at least three control sensors (which may by duplicates of each other), e.g. based on a majority decision, an average or other predefined relationship between the outputs of the duplicate sensors. The controller may be configured to adjust the control of the propulsion system on the basis of signals from an odd number of control sensors, which may include at least three control sensors that are duplicates of each other.

The property of the riser may be or comprise one or more properties of part of the riser, e.g. the flex joint. The riser may comprise or be provided with at least two flex joints. A respective flex joint may be provided at opposing ends of the riser. At least one of the flex joints may be configured to be located underwater. At least one of the flex joints may be configured to be located at or near the sea bed, e.g. proximate or connected to the wellhead, Xmas tree, manifold, or blow out preventer (BOP). At least one of the control sensors may be configured to monitor the property of the flex joints, e.g. to monitor the angle, inclination, bending, flex, stress or strain of the flex joint. At least one of the control sensors may be provided on or coupled to at least one or each of the flex joints.

One or more of the control sensors may be provided at one or both ends of the riser, at a mid-point of the riser and/or distributed along the riser.

The controller may be operable to monitor the property of the riser against the one or more criteria. At least one of the criteria may comprise the associated threshold or operational range. The controller may be configured to adjust the control of the propulsion system depending on whether or not the one or more criteria are met, e.g. depending on whether or not the property of the riser is within or outwith the associated threshold or operational range.

The controller may be configured to adjust the control of the propulsion system depending on the power demanded or consumed by the propulsion system, e.g. depending on an amount of power demanded or consumed or a rate of change in the power demanded or consumed.

The adjustment of the control of the propulsion system may comprise limiting, reducing or otherwise modifying the power characteristic of the propulsion system, for example when the property of the riser determined by the controller is below the associated threshold or within the operational range and optionally also when the amount of power demanded or consumed by the propulsion system is above the power threshold.

The adjustment of the control of the propulsion system may protect against drive-off of the vessel. The controller may be configured to selectively apply the adjustment of the control of the propulsion system based on one or more conditions. One of those conditions may be that the property of the riser determined by the controller is below the associated threshold or within the operational range. One of the conditions may be that the amount of power demanded or consumed by the propulsion system is above the power threshold. In other words, if the condition or conditions are met, then the controller is configured to selectively apply the adjustment of the control of the propulsion system, e.g. by limiting the power characteristic of the propulsion system, otherwise the system simply controls the propulsion system based on the determined position of the vessel relative to the target position without the adjustment of the control of the propulsion system.

However, the controller may be configured to use other conditions in addition to the property of the riser determined by the controller being below the associated threshold or within the operational range.

For example, one of the conditions may be that the demand, or rate of increase in demand, of the propulsion system is greater than a first conditional threshold whilst weather or environmental data received by the controller indicates that there has been no corresponding change in weather or environmental conditions. Many conventional dynamic positioning adjustments may be due to weather or environmental conditions. If a sudden increase in power demand is determined without a corresponding change in weather or environmental conditions, then this may be indicative that the determined control of the propulsion unit based on the determined position of the vessel is incorrect.

In another example, one of the conditions may be that the demand, or rate of increase in demand, of the propulsion system is greater than a second conditional threshold resulting from a change in position that is greater than a distance threshold, e.g. greater than 5 m or 10 m, which may be over a predetermined or determined period of time. If the system determines that the vessel has made a very quick or instantaneous movement beyond the distance threshold, then this may be indicative that there is an error in the position determination made by the controller, as such as movement of a vessel may be unlikely.

In another example, at least one of the conditions may comprise a condition based on vessel current. At least one of the conditions may comprise the demand, or rate of increase in demand, of the propulsion system being greater than a threshold whilst a vessel current is less that a threshold. The vessel current may have been less than the threshold for a determined or predetermined period of time. The vessel current may be a sum of the forces on the vessel minus any wind forces.

The limitation, reduction or modification of the operation of the propulsion system may allow some operation of the propulsion system, but the operation of the propulsion system may be slower, delayed or less than would otherwise be allowed.

The controller may be configured such that, when the property of the riser is above the threshold or outwith the operational range, then the controller controls the propulsion system according to the difference between the determined position of the vessel and the target position, e.g. without the additional limiting or other adjustment of the propulsion system.

The adjustment to the control of the propulsion system may be time dependant, e.g. time limited. For example, the controller may be configured to limit, reduce or otherwise modify the operation (e.g. the power or rate of increase in power) of the propulsion system for a determined or predetermined period of time.

With prior art dynamic positioning controllers, when a sensor or other means used by the controller to determine the position of the vessel gives an incorrect reading then the prior art controller could potentially incorrectly determine that the vessel is out of position when it is not or is further out of position than it really is and increase operation of the propulsion system (e.g. thrusters) of the vessel in order to remedy this incorrectly determined situation. This may undesirably result in the vessel driving off or away from the target position rather than maintaining it. When the vessel is handling or otherwise supporting a riser, this could undesirably incline, bend, flex or even damage the riser.

The controller described herein may be in communication with control sensors or other mechanisms for determining properties of at least part of the riser, such as the angle, orientation, inclination, bending, flex, stress or strain of at least part or all of the riser. The controller may use the determined properties of the riser to adjust the control of the propulsion system.

If the riser isn't angled, inclined or flexed above or beyond a threshold or operational limit, then it may be indicative that the riser is close to a configuration associated with the vessel being in the target position, such that any sudden requirement determined by the controller to greatly increase power or operation of the propulsion system may be spurious. In this case, the controller may limit the operation (e.g. it may limit the power or a rate of increase in power) of the propulsion system. The controller may limit the operation (e.g. it may limit the power or a rate of increase in power) of the propulsion system only if the power being demanded or consumed by the propulsion system is also above the power threshold.

In this way, when one of the sensors or other means used by the controller to determine the position of the vessel gives an incorrect reading but the property (e.g. inclination) of the riser is still within the threshold or operational range, then the controller may provide a limit on the power or rate of increase in power of the propulsion system (e.g. thrusters) of the vessel, even though the (incorrectly) determined position of the vessel relative to the target position would otherwise indicate that the power or rate of increase in power of the propulsion system should be beyond the limited amount. This may delay, reduce or limit any drive-off that would otherwise occur due to errors in the position determination. This may provide time for a human operator to identify any potential incorrect drive-off situation that is occurring or likely to occur and have sufficient time to intervene.

By limiting rather than preventing all operation of the propulsion system of the vessel when the controller determines that the property of the riser meets the criteria, e.g. is within the threshold or operational range, and optionally also when the power demanded or consumed by the propulsion system is above the power threshold, then low power operations of the propulsion system to make fine adjustments that are unlikely to result from errors in the determined position can still be performed, whilst large ramp ups in operation of the propulsion system are limited.

Furthermore, by limiting only the rate of increase of the power consumed by the propulsion system and/or by making any adjustment (e.g. limiting) of the operation of the propulsion system time dependent, then the determined increase in power may only be slowed or delayed rather than prevented. This may allow an operator to reasonably make a manual intervention but the limitation on the power consumed by the propulsion system may not persist to the extent that it could undesirably prevent a genuine corrective action.

The riser may be provided with flex joints, in which case, the flex joints may experience a proportionally higher degree of change in angling, inclination, reorientation, stress or strain than the rest of the riser when the vessel supporting the riser deviates from the target position. As such, by using the properties (e.g. inclination, angle, stress, strain etc.) of the flex joint rather than the rest of the riser, then the controller may more sensitively and/or accurately determine whether or not the control of the propulsion system needs adjusted.

The controller may be configured to receive data indicative of, or usable to determine, a position of the vessel from at least one further sensor. The controller may be configured to determine the position of the vessel using the data received from the at least one further sensor.

The further sensors may comprise sensors that are used or usable for determining the position of the vessel and/or for monitoring environmental, sea or weather conditions at or around the vessel. At least one or each of the further sensors may be provided on the vessel. The further sensors may comprise more than one different type of further sensor.

At least one of the further sensors used to determine the position of the vessel may comprise at least one satellite positioning system sensor, e.g. at least one GPS, GLONASS or Galileo sensor, configured to determine the position of the vessel using satellite positioning. The further sensors may comprise at least two different types of satellite positioning sensor. In one example, at least one of the further sensors comprises a DGPS 700 and at least one of the further sensors comprises a DGPS 5D sensor.

At least one of the further sensors used to determine the position of the vessel may comprise at least one weather sensor, such as a wind sensor for monitoring the speed, strength and/or direction of the wind at or around the vessel.

At least one of the further sensors used to determine the position of the vessel may comprise at least one motion sensor such as a gyroscope or accelerometer for monitoring motions, e.g. movement, translation or reorientation, of the vessel. In one example, the further sensors may comprise at least four gyros for monitoring motion of the vessel.

At least one of the further sensors used to determine the position of the vessel may comprise at least one relative positioning sensor for determining the position of the vessel relative to one or more reference points. The at least one relative positioning sensor may comprise a beam sensor configured to transmit a beam to and/or receive a beam from a reference point. The beam may comprise a microwave, radiofrequency, sonic or ultrasonic, sonar, optical, visible light, infra-red or ultra-violet, laser, cellular communications, or other radiation beam. At least one of the reference points may be provided on land, on the sea bed, on another vessel or sea based structure, and/or the like. The at least one relative positioning sensor may comprise a line connected to the associated reference point, the at least one relative positioning sensor being configured to determine changes in tension or force in the line, which may be indicative of change in position of the vessel. The line may be or comprise a taut wire. One end of the taut wire may be fixedly anchored to the seabed or other fixed structure. The other end of the taut wire may be connected or coupled to the vessel. The at least one positioning sensor may be configured to determine variation in the tension of the taut wire to thereby determine differences in position.

The further sensors are not limited to the examples given above. The controller may be configured to use the signals from each of the further sensors individually and/or combinations of different types of further sensor to determine the position of the vessel. For example, at least one of the further sensors used to determine the position of the vessel may comprise a sea sensor configured to determine water speed, tide direction and/or strength, wave height and/or the like.

The target position may be a pre-set position or a manually set position and may be stored in a memory of the controller.

The controller may comprise at least one processor. The controller may comprise and/or be configured to access at least one data store or memory. The controller may comprise a communications system, such as a wired and/or wireless communications system. The controller may be configured to communicate with a control system of the vessel, the propulsion system of the vessel, that at least one control sensor and/or the at least one further sensor, e.g. via wired and/or wireless communication.

The controller may be configured to communicate control actions to the vessel controller or to the propulsion system using the communications system.

The controller may be separate to, remote and/or distinct from a dynamic positioning system of a vessel. The controller may be configured to communicate with an existing dynamic positioning system of a vessel. The controller may be configured to control or intervene in the control of the dynamic positioning system. The controller may be configured to be retro-fitted to an existing dynamic positioning control system.

The controller may be integrated with a dynamic positioning system of a vessel. The controller may be a module of the dynamic positioning system of the vessel. The controller may be a software or hardware module of the dynamic positioning system. The controller may be implemented as part of a control system of the dynamic positioning system.

The controller may comprise or be comprised in a dynamic position system controller. The controller may comprise a drive-off prevention controller that is configured to override or modify the control of the dynamic positioning system by the dynamic positioning system controller. The controller may comprise both the dynamic position system controller and the drive-off prevention controller. The drive off prevention controller may be configured to monitor the property of at least the part of the riser; and adjust the control of the propulsion system accordingly. The dynamic positioning system controller may be configured to determine the position of the vessel relative to the target position and to control the propulsion system of the vessel based on the determined position of the vessel relative to the target position. The controller may be configured to communicate with the dynamic position controller, e.g. to override or adjust control commands issued by the dynamic position controller based on the monitored property of at least the part of the riser. The control command may be a command for controlling the propulsion system.

The drive-off prevention controller may not directly control the propulsion system of the vessel. The dynamic positioning system controller may control the propulsion system, e.g. via the control commands. The drive-off prevention controller may be operable to communicate with the dynamic positioning system controller so that the control commands issued by the dynamic positioning system controller are adjusted responsive the communication from the drive-off prevention controller in order to implement the adjustment of the control of the propulsion system.

The controller may be selectively switchable between a conventional operation mode and an intervention enabled mode. The conventional operation mode may be a mode in which the controller controls the propulsion system of the vessel based on the determined position of the vessel relative to the target position without a possibility of further limiting or adjustment of the power characteristic. The conventional operation mode may be a mode in which the drive-off prevention controller is prevented from adjusting the control of the propulsion system, regardless of the property of the riser. The intervention enabled mode may be a mode in which the controller is configured to monitor a property of a riser extending from the vessel and to adjust the control of the propulsion system accordingly. The controller of the present invention may be usable in the intervention enabled mode in shallow water. Shallow water may be water having a depth of 300 m or less, e.g. 100 m or less. The conventional mode may be preferable during deep water operations where less bending or tilting of the riser occurs, whereas the intervention mode may be preferable in shallow water operations in which the riser may be more susceptible to damage due to bending and the general operational range of the riser corresponds more closely to a straight riser.

The controller may be configured so that the intervention enabled mode or the adjustment of the control of the propulsion system can be overridden, switched off or cancelled, which may be done manually, e.g. by an operator. In this way, if the operator identifies that the controller is adjusting the control of the propulsion system or has identified that an adjustment of the control of the propulsion system is required, but that the operator determines that the dynamic positioning operation is justified, then the operator can over-ride or cancel the adjustment of the propulsion system.

The dynamic positioning system of the vessel may be configured to run in a mode other than a bias mode. The bias mode may be a mode in which pairs of thrusters oriented in opposite directions are run simultaneously to use excess energy generated. The dynamic positioning system may be configured to selectively switch out of bias mode. The dynamic positioning system or vessel may comprise energy storage. The energy storage may be configured to receive excess power from generators. The energy storage may be configured to selectively supply power to the propulsion system. The energy storage may comprise a battery, flywheel, capacitor, and/or the like. Running in a bias mode may give a misleading view of the energy consumption of the propulsion system, which may impact the accuracy of the controller in detecting drive-off conditions. Use of the energy storage to accommodate excess power generated and/or the ability to run in a mode other than a bias mode may remedy this.

A second aspect of the present disclosure relates to a dynamic positioning system comprising the controller of the first aspect. The dynamic positioning system may comprise a propulsion system or the controller of the dynamic positioning system may be configured to communicate with a control system of the vessel and/or directly with the propulsion system of the vessel, in order to control the propulsion system of the vessel during dynamic positioning of the vessel. The dynamic positioning system may comprise or be configured to communicate with the at least one control sensor, e.g. for determining the one or more properties of the riser. The dynamic positioning system may comprise or be configured to communicate with the at least one further sensor to determine the position of the vessel.

A third aspect of the present disclosure relates to a method for dynamically positioning a vessel, the method comprising:
  determining a position of a vessel relative to a target position;
  controlling a propulsion system of the vessel based on the determined position of the vessel relative to the target position;
  monitoring a property of a riser; and
  adjusting the control of the propulsion system based on the one or more properties of a riser.

Adjusting control of the propulsion system may comprise limiting a power characteristic of the propulsion system when the property of the riser meets one or more criteria. The power characteristic may comprise power demanded or supplied, or a rate of increase in power demanded, consumed or produced by the propulsion system. The criteria may comprise the property of the riser being within a threshold or operational range. Adjusting control of the propulsion system may further comprise limiting the power characteristic of propulsion system if the power demanded, consumed by the propulsion system is above a power threshold.

The one or more properties may be or comprise an angle, orientation, inclination, bending, flex, stress or strain of at least part or all of the riser. The one or more properties may be or comprise an angle, orientation, inclination, bending, flex, stress or strain of at least one flex joint of the riser.

The adjustment to the control of the propulsion system may be time dependant, e.g. time limited. For example, the method may comprise limiting the operation (e.g. the power or rate of increase in power) of the propulsion system for a determined or predetermined period of time.

The method may be implemented using the controller of the first aspect and/or may comprise at least one action of the controller described in relation to the first aspect.

According to a fourth aspect of the present disclosure is a computer program product comprising computer readable instructions that, when implemented on a computer or a controller of a dynamic positioning system, causes the computer or controller to implement the method of the third aspect.

According to a fifth aspect of the present invention is a carrier medium comprising the computer program product of the fourth aspect. The carrier medium may be a transient or a non-transient carrier medium. The carrier medium may be a tangible carrier medium, such as an optical disk, a magnetic disk, a digital memory, a solid state storage device or solid state drive (SSD), a magnetic tape, a hard drive, and/or the like.

According to a sixth aspect of the present invention is a drive-off prevention controller for a dynamic positioning system, wherein:
  the dynamic positioning system is configured to determine a position of a vessel relative to a target position and to control a propulsion system of the vessel based on the determined position of the vessel relative to the target position; and
  the drive-off prevention controller is configured to monitor a property of at least part of a riser extending from the vessel; and adjust the control of the propulsion system accordingly.

The drive off controller may be configured to communicate with the dynamic positioning system or a dynamic positioning system controller.

The drive-off prevention controller may comprise any feature described above in relation to the controller of the first aspect individually or in combination with any other feature described above in relation to the controller of the first aspect, regardless of if they are described individually or in combination with respect to the first aspect.

The drive-off prevention controller of the sixth aspect may not determine a position of a vessel relative to a target position and to control a propulsion system of the vessel based on the determined position of the vessel relative to the target position.

The drive-off prevention controller of the sixth aspect may be comprised in or may be a component of the controller of the first aspect.

According to a seventh aspect of the present invention is a drive-off prevention controller for a dynamic positioning system, the drive off controller configured to communicate with the dynamic positioning system, wherein:
  the dynamic positioning system is configured to determine a position of a vessel relative to a target position and to control a propulsion system of the vessel based on the determined position of the vessel relative to the target position; and
  the drive-off prevention controller is configured to selectively apply the adjustment of the control of the propulsion system based on one or more conditions.

At least one of the conditions may comprise a sudden change in position of the vessel. The sudden change in position of the vessel may be a change in position of the vessel greater than a distance threshold, e.g. greater than 5 m or 10 m, which may be over a predetermined or determined period of time. At least one of the conditions may be the demand, or rate of increase in demand, of the propulsion system being greater than a threshold, wherein the demand, or rate of increase in demand may result from the sudden change in position.

At least one of the conditions may comprise a property of a riser determined by the controller being below the associated threshold or within the operational range.

At least one of the conditions may comprise an amount of power demanded or consumed by the propulsion system being above a power threshold.

At least one of the conditions may comprise a position of the vessel determined using an alternative technique or sensor indicating that the vessel is at or within a threshold distance of the target location, whilst a position of the vessel determined by the dynamic positioning system indicates that the vessel is further away from the target location, e.g. further away than a threshold distance from the target location. The an alternative technique or sensor may be an alternative technique or sensor to that used by the dynamic positioning system.

At least one of the conditions may comprise a condition based on vessel current. At least one of the conditions may comprise the demand, or rate of increase in demand, of the propulsion system being greater than a threshold whilst a vessel current is less that a threshold. The vessel current may have been less than the threshold for a determined or predetermined period of time. The vessel current may be a sum of the forces on the vessel minus any wind forces.

At least one of the conditions may be the demand, or rate of increase in demand, of the propulsion system being greater than a first conditional threshold whilst weather or environmental data received by the drive-off prevention controller indicates that there has been no corresponding change in weather or environmental conditions.

According to an eighth aspect is a controller, the controller comprising a dynamic positioning system controller and a drive-off prevention controller according to the sixth aspect or seventh aspect. The dynamic positioning system controller may be configured to determine a position of a vessel relative to a target position and to control a propulsion system of the vessel based on the determined position of the vessel relative to the target position.

The individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

Various aspects and examples of the present disclosure relate to methods, systems and apparatus for the dynamic position control of offshore vessels. Any vessel may be considered, but for the purposes of the exemplary description provided below, a semi-submersible drilling vessel or "rig" is presented.

Figure 1:
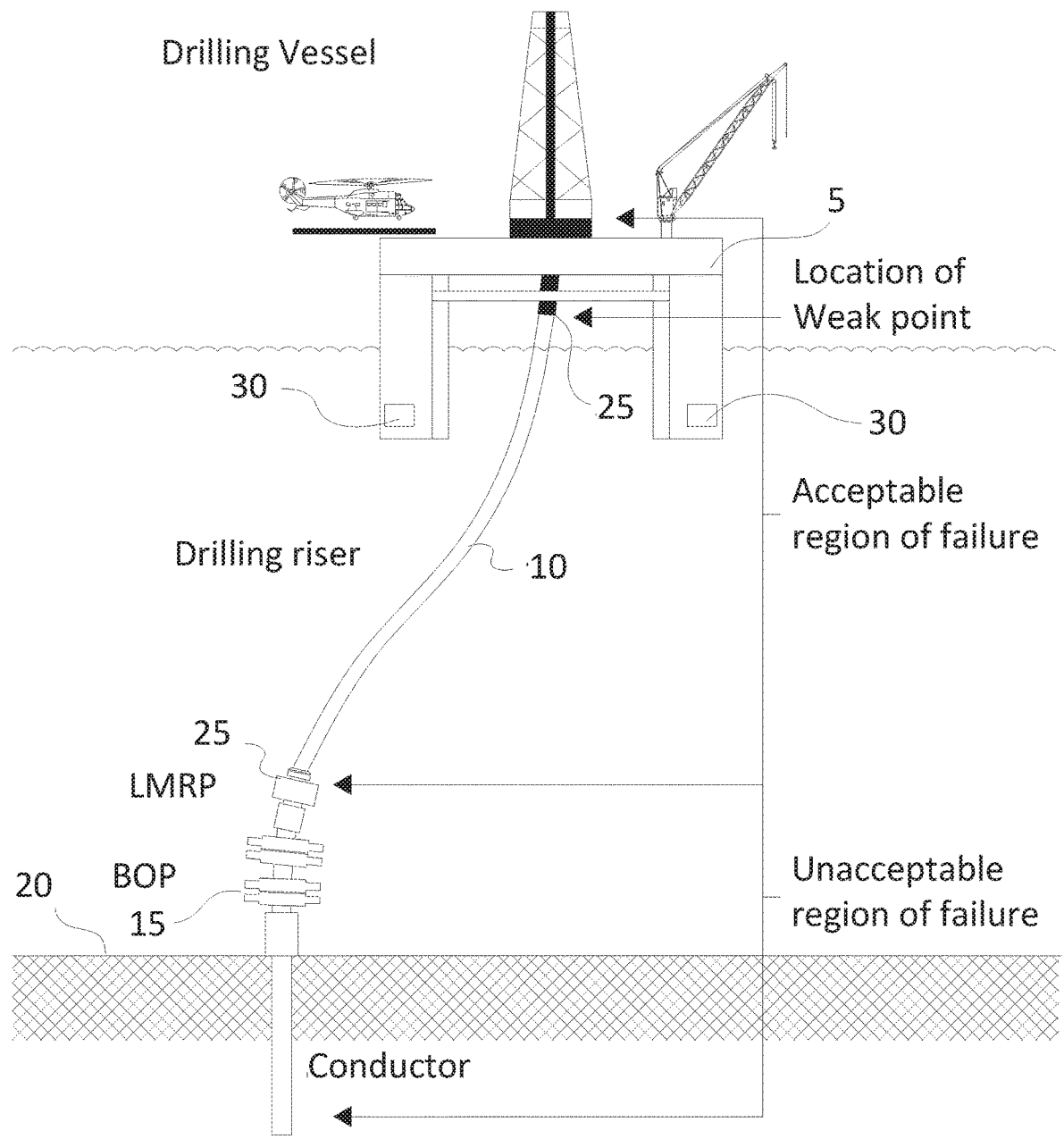
FIG. 1 is a schematic of a drilling arrangement.

FIG. 1 shows a semi-submersible 5 that is connected to and supports one end of a riser 10, which may be a drilling riser. The riser 10 extends from the vessel 5, underwater to connect to a structure such as a blow-out preventer (BOP) 15 on the sea bed 20. The riser is provided with a pair of flex joints 25, one at the surface end and one at the subsea end. The vessel 5 can be moved, e.g. due to currents, waves and wind, and is maintained in a target position using a dynamic positioning system, as is well known in the art. The vessel comprises a propulsion system that comprises a plurality of propulsion devices such as thrusters 30. The thrusters 30 are configured to propel the vessel 5 in different directions and are selectively controllable to adjust the position of the vessel 5.

The vessel shown in FIG. 1 is a drilling rig, but it will be appreciated that use of dynamic positioning is not limited to this and can equally be used for ships, remotely operated vehicles or indeed any other suitable vessel or vehicle that uses a dynamic positioning system. Furthermore, although the riser 10 is connected at the subsea end to a BOP 15, it will be appreciated that the riser could be connected to any other suitable wellhead apparatus, such as a Xmas tree.

The dynamic positioning system of the vessel 5 is configured to determine the position of the vessel 5, compare the determined position of the vessel 5 with a target position and determine corrective control actions for specific thrusters 30 to, as far as possible, maintain the semi-submersible 5 substantially in the target position.

The dynamic positioning system can determine the position of the vessel using a range of sensors, such as satellite positioning sensors, beam based triangulation or relative positioning sensors, wire tension monitoring systems, sea monitoring sensors (e.g., acoustics), and/or the like. Although modern sensors used for position determination are generally reliable and failures can be mitigated by providing multiple sensors and different types of sensor, any failures or errors in the sensors used for position determination can cause the dynamic positioning system to believe that the vessel 5 has deviated further from the target position than it actually has. This in turn may cause the dynamic positioning system to request a sudden significant ramp up in the power of one or more of the thrusters 30 of the vessel 5 to counteract the false determination from the dynamic positioning system. This ramp up in thruster 30 operation resulting from the erroneous readings from the sensor used for position determination may have the effect of the vessel "driving off" from the target position.

Since the riser 10 is suspended between the vessel 5 and the BOP 15 or other well head component, drive-off of the vessel results in different parts of the riser being subjected to different degrees of bend, tilt or re-orientation. Generally the ends of the riser 10 that are connected to the wellhead and supported by the vessel 5 are the worst affected and most likely to suffer failure as a result of the drive-off. The flex joints 25 are designed to preferentially flex or bend and can provide a degree of protection against such failure, but improved mechanisms for preventing drive off would be advantageous.

Figure 2:
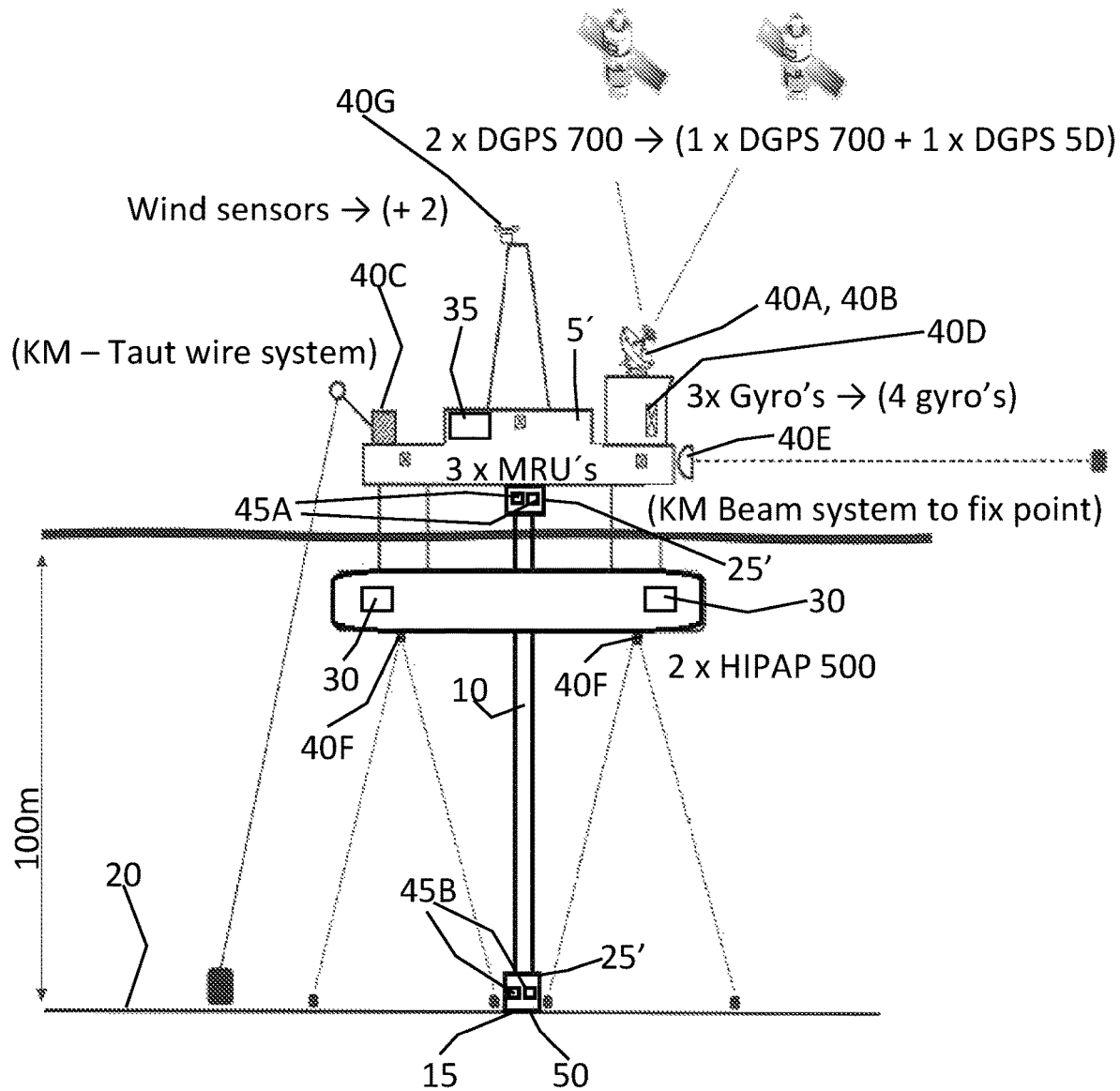
FIG. 2 is a schematic of an example of a drilling arrangement involving a drilling vessel.

FIG. 2 shows a vessel 5' provided with a dynamic positioning system that comprises a controller 35 that is in communication with a plurality of sensors 40A-40G used for position determination and a plurality of control sensors 45A, 45B. The controller 35 is also configured to communicate with and control a propulsion system that comprises a plurality of propulsion devices of the vessel 5' in the form of thrusters 30. The propulsion system is a system specifically for manoeuvring and repositioning the vessel.

As in the example of FIG. 1, the vessel 5' supports an end of a riser 10' that extends between the vessel 5' and a wellhead 50 on the seabed 20. Each end of the riser 5' is provided with a flex joint 25' and each flex joint is provided with at least three of the control sensors 45A, 45B that monitor at least one property of the flex joint 25' that changes when the vessel 5' is moved. Suitable properties of the flex joint include tilt, inclination, angle, orientation, flex, bend, stress or strain, or other suitable property of the respective flex joint 25' or other part of the riser 10'. The controller 35 is configured to determine a value for the at least one property of each flex joint 25' based on the readings from the plurality of control sensors 45A, 45B for that flex joint 25', e.g. by a majority decision, averaging or other statistical procedure. However, the control sensors need not be located only at the flex joint 25' and one or more control sensors may be provided on or along the riser 10', in addition to or as an alternative to the control sensors 45A, 45B at the flex joints 25'.

The sensors 40A-40G used for position determination include a variety of different sensor types. In this particular example, the sensors 40A-40G used for position determination include at least two satellite navigation sensors 40A, 40B provided on the vessel 5. In the present example, each of the satellite navigation sensors 40A, 40B is a different type of satellite navigation sensor, e.g. one of the satellite navigation sensors 40A is a DGPS 700 sensor, whilst the other is a DGPS 5D sensor. However, it will be appreciated that the satellite navigation sensors may be the same type of sensor or may comprise other types of satellite navigation sensors, such as GLONASS, Galileo or other sensors.

The sensors 40A-40G used for position determination in this example also include a wire sensor 40C on the vessel 5 that determines a tension or force on a taut wire that is suspended between the vessel 5 and a fixed external point, e.g. on the sea bed. As the vessel 5 moves relative to the fixed external point, then the tension or force on the wire changes, which is measured by the wire sensor 40C and can be used in the estimation of position of the vessel 5.

The sensors 40A-40G used for position determination in this example also include a plurality of motion sensors 40D, in this example in the form of four gyroscopic sensors, which are configured to measure motion of the vessel. However, other numbers or types of motion sensors 40D, such as accelerometers, could be used.

The sensors 40A-40G used for position determination in this example further include a plurality of beam position sensors 40E, 40F, including a surface based beam sensor 40E that sends a beam to and/or receives a beam from a reference point, e.g. on land or on another vessel or other sea structure. The surface based beam sensor 40E can be used to determine changes in position of the vessel 5 relative to the reference point. Similarly, the vessel 5 comprises a plurality of underwater beam sensors 40F, such as sonar or other sonic sensors, that are each in communication with a plurality of reference points located on the sea bed using sonic or sonar signals and can be used to determine changes in the location of the vessel 5 using the relative timing and/or strength of the sonic or sonar signal received from each reference point. A plurality of reference points for each sensor 40F allows direction of motion of the vessel to be determined, e.g. using triangulation or other suitable techniques.

The sensors 40A-40G used for position determination in this example further include condition sensors 40G, which include weather sensors such as wind sensors, and also include water current sensors to determine current direction and speed of water currents.

The controller 35 is in communication with all of the sensors 40A-40G used for position determination and uses the data collected by the sensors 40A-40G used for position determination to determine a position of the vessel 5, e.g. according to a predetermined algorithm or other suitable relation.

Figure 3:
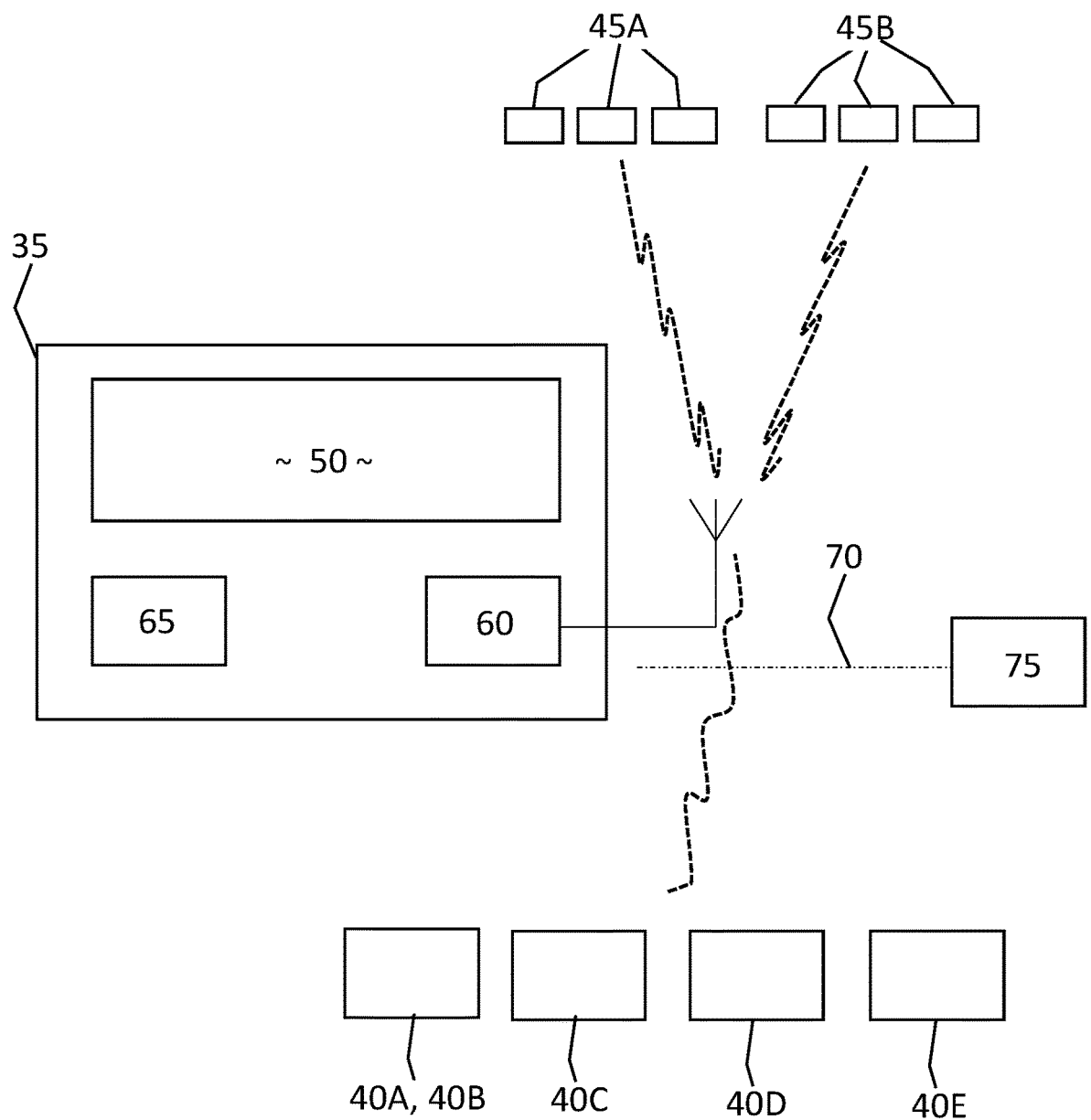
FIG. 3 is a schematic of a control system for a dynamic positioning system for the drilling vessel shown in FIG. 2.

A detailed schematic of the controller 35 is shown in FIG. 3. The controller 35 comprises a processor 55, a communications system 60 and a data store in the form of a memory 65. The communications system 60 is configured to communicate via wires 70 or wirelessly with the plurality of sensors 40A-40G used for position determination and the plurality of control sensors 45A, 45B to receive data signals therefrom. The communications system 60 is also configured to communicate via wires 70 or wirelessly with the vessel control system 75 that controls the thrusters 30 of the vessel 5 so as to be able to send control signals to the vessel control system 75 to control the thrusters 30. The wireless communications could comprise acoustic communications, e.g. along the riser 10, 10'.

Although an example of a controller 35 is shown in FIG. 3, it will be appreciated that other controller configurations could be used. For example, the controller 35 may comprise a plurality of processors 55 and/or a plurality of data stores 60, which may be contained in a single unit or distributed, e.g. over several systems, some of which may be remote.

Furthermore, in an example, the controller could be functionally, logically or physically separated into a drive-off prevention controller and a dynamic position system controller. The dynamic positioning system controller determines the position of the vessel relative to the target position and controls the propulsion system of the vessel based on the determined position of the vessel relative to the target position. The drive-off prevention controller is configured to override or modify the control of the dynamic positioning system by the dynamic positioning system controller. In particular, the drive off prevention controller is configured to monitor the property of the riser 10 and the control of the thrusters 30 is adjusted according to the determined value of the property of the riser 10. In this way, the drive-off control functionality may be retro-fitted to an existing dynamic positioning system by retro-fitting the drive-off controller, which communicates with (or is provided by a common control or computer system with) the dynamic positioning system controller of the existing dynamic positioning system.

In this way, the controller 35 can receive data from the plurality of sensors 40A-40G used for position determination, which is processed by the controller 35 to determine the position of the vessel 5. The controller 35 can also receive data from the plurality of control sensors 45A, 45B, which is processed by the controller 35 to determine the at least one property, e.g. inclination, of at least part of the riser 10 (in this case the inclination or orientation of the flex joints 25 but in other embodiments could be elsewhere on the riser 10).

Figure 4:
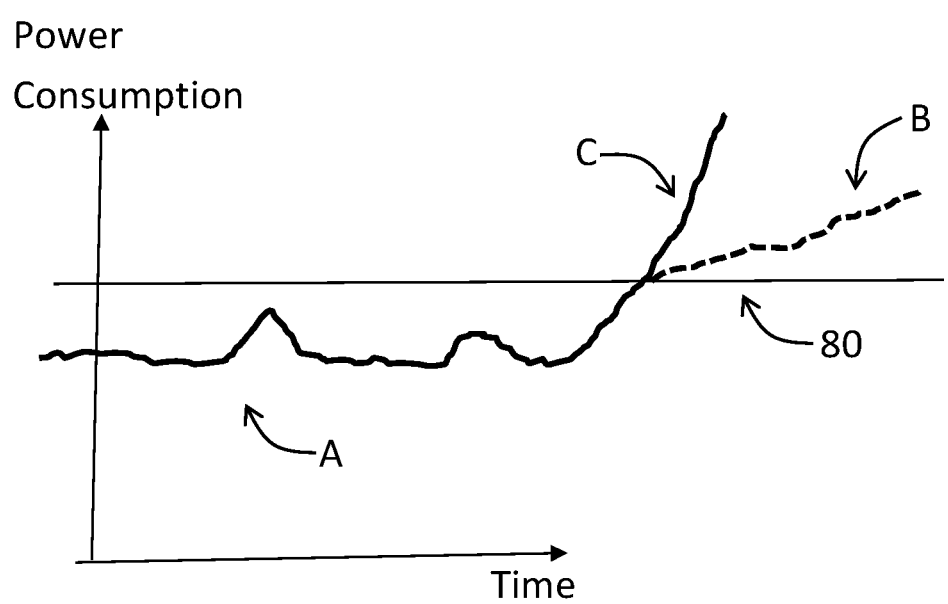
FIG. 4 is a comparison of power consumption in a dynamic positioning control scheme implemented by the control system of FIG. 3 relative to that of a conventional control scheme.
Figure 5:
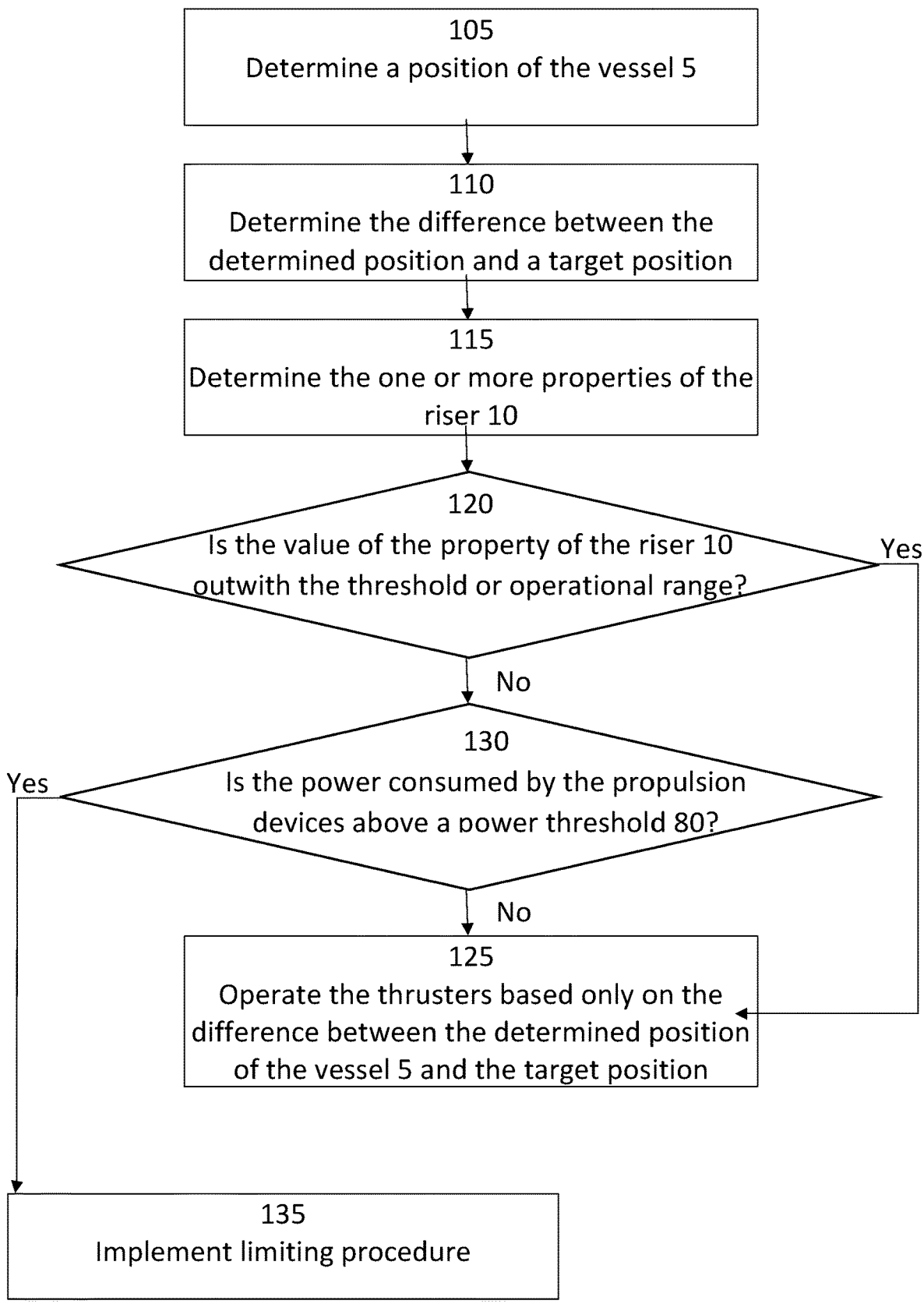
FIG. 5 is a flowchart illustrating a method of performing dynamic positioning.

The actions performed by the controller 35 are described in relation to FIGS. 4 and 5.

In 105 of FIG. 5, the controller 35 determines a position of the vessel 5 from data from the plurality of sensors 40A-40G used for position determination. In 110 of FIG. 5, the controller 35 determines the difference between the determined position and a target position, stored in the data store 65 and determines a control operation of the thrusters that is dependent on the determined difference, e.g. based on a look-up table, algorithm or some other predetermined relationship. The control operation is communicated from the controller 35 to the vessel control system 75 which then controls the thrusters 30 accordingly.

The power consumption of the thrusters 30 is monitored and communicated to the controller 35.

In 115 of FIG. 5, the controller 35 determines the one or more properties of the riser 10 (e.g. inclination, angle, orientation, stress or strain) from the data supplied by the plurality of control sensors 45A, 45B on the flex joints 25 of the riser 10. In 120 of FIG. 5, the controller 35 compares the one or more determined properties of the riser 5 with a respective threshold or operational range for the property.

The threshold or operational range may be pre-programmed and stored in the memory 65, calculated or manually input.

If the controller 35 determines that the value of the one or more properties of the riser 10 is above the threshold or outwith the operational range, then this is indicative of the riser 10 being in a condition in which the vessel 5 is significantly away from the target position and the controller 35 is configured to operate the thrusters 30 in accordance with the control operation determined from the difference between the determined position of the vessel 5 and the target position (125 of FIG. 5).

However, if the controller 35 determines that the value of the one or more properties of the riser 10 is below the threshold or within the operational range, then this is indicative of the riser 10 being in a condition in which the vessel 5 is close to the target position. In this case, the controller 35 determines if the power currently being consumed by the thrusters 30 is above a power threshold 80 (130 of FIG. 5) and, if so, implements a limiting procedure in which the control operation of the thrusters 30 is adjusted such that the rate of increase in power supplied to the thrusters above a threshold power 80 is limited (135 of FIG. 5). If not, the controller continues to operate the thrusters 30 in accordance with the control operation determined from the difference between the determined position of the vessel 5 and the target position (125 of FIG. 5).

In this way, as can be seen in region A of FIG. 4, the controller 35 can control the thrusters 30 with small variations in power to make small adjustments to the position of the vessel 5, as would be expected to respond to tides, current, waves and wind, for example. However, if the operational control determined by the controller 35 results in the power supplied to the thrusters 30 being above the power threshold 80, then the controller 35 adjusts control of the thrusters such that the rate of increase in power consumed by the thrusters is limited, as can be seen in region B of FIG. 4. This prevents a large, sudden increase in power drawn by the thrusters 30, which would otherwise be the case (see region C in FIG. 4) and instead results in a much slower ramp up of thruster 30 operation.

In this way, whilst the at least one property of the riser 10 is within the threshold or operational range, then it is likely that the vessel is close to the target position such that any large, sudden increases in thruster operation 35 are more likely to be the result of erroneous reading from one of more of the sensors 40A-40G used for position determination and are as such delayed by limiting the rate of increase of thruster power 35 beyond a power threshold. This allows an operator much more time to assess if the situation requiring the ramp up in thruster 30 power is genuine and to make a manual intervention if it is not. However, it does not prevent low power operations of the thrusters 30 that result in a power draw that is below the power threshold that are much more likely to be genuinely needed. Beneficially, the limiting of the rate of increase of power in the manner described also does not prevent increases in thruster 30 operation, it only delays them and only in cases where the control sensors indicate that the riser is in a configuration associated with the vessel being close to the target range. This ensures that any genuine requirement for increased thruster 30 operation above the power threshold will get implemented, albeit delayed. Furthermore, the controller 35 may optionally be configured to implement a time dependent limiting scheme, wherein the limit on rate of increase in power is ended or increased after a certain period of time.

In view of the above, examples of the controller 35 provide improved prevention of drive-off due to errors in the determination of the position of the vessel 5, e.g. due to faulty sensors and the like.

Although, specific examples are described above in relation to the Figures, it will be appreciated that variations on the above examples are possible. For example, although two sets of control sensors 45A, 45B, each set comprising three duplicate sensors, are provided on each of the two flex joints 25, it will be appreciated that the control sensors could be provided on other parts of the riser 10 or that different numbers or arrangements of control sensors 45A, 45B could be provided. Furthermore, although certain specific examples of sensors 40A-40G used for position determination are given above, it will be appreciated that different sensors or combinations of sensors could be used instead.

Although examples described above use power consumed or rate of increase in power consumed, as a metric or threshold, it will be appreciated that other metrics such as power demand, rate of increase in power demand, power output or rate of increase in power output may be used instead.

In addition, in the example given above, the controller is configured to selectively apply the adjustment of the control of the propulsion system based on one or more conditions in order to protect against drive-off. One of those conditions (120 in FIG. 5) is that the property of the riser determined by the controller is below the associated threshold or within the operational range. Another condition (130 in FIG. 5) is that the amount of power demanded or consumed by the propulsion system is above the power threshold. In other words, if all of the conditions are met, then the controller selectively applies the adjustment of the control of the propulsion system, e.g. by limiting the power characteristic of the propulsion system, otherwise the system simply controls the propulsion system based on the determined position of the vessel relative to the target position without the adjustment of the control of the propulsion system.

However, the controller may be configured to use other conditions in addition to or instead of any of the conditions above. For example, one of the conditions may be that the demand, or rate of increase in demand, of the propulsion system is greater than a first conditional threshold whilst weather or environmental data received by the controller indicates that there has been no corresponding change in weather or environmental conditions. In another example, one of the conditions may be that the demand, or rate of increase in demand, of the propulsion system is greater than a second conditional threshold resulting from a change in position that is greater than a distance threshold, e.g. greater than 5 m or 10 m, over a predetermined or determined period of time.

Furthermore, the vessel 5 need not be a drilling rig and other vessels such as ships or ROVs could be used instead.

Although one possible example of controller 35 is descried in relation to FIG. 3, the controller 35 configuration is not limited to this. Method steps of the invention can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customised circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

As such, the present invention is not limited by the examples shown in the drawings but only by the claims.

The invention claimed is:

1. A drive-off prevention controller for controlling a propulsion system of a vessel with a plurality of thrusters, a riser extending from the vessel, and a plurality of control sensors configured for monitoring riser properties, wherein the controller is configured for:
   determining a difference between a determined position for the vessel and a target position,
   determining a control operation for thrusters, the control operation having a power characteristic dependent on the determined difference,
   determining an adjusted control operation for the thrusters, wherein the adjusted control operation implements a limiting procedure of the power characteristic to below a threshold less than the power characteristic of the control operation,
   determining one or more properties of the riser from data supplied by the plurality of control sensors, and
   determining whether the one or more properties of the riser is within an operational range, the operational range comprising a maximum value of the one or more determined properties at which riser disconnection can occur;
   when the one or more properties of the riser are out of the operational range, operating the thruster by applying the control operation, and
   when the one or more properties of the riser are within the operational range, operating the thruster by applying the adjusted control operation.

2. The controller of claim 1, further comprising operating the thruster by applying the adjusted control operation when the property of at least part of the riser is within an associated threshold or operational range.

3. The controller according to claim 2, wherein the controller is configured to increase the associated threshold or operational range when the vessel current increases or is above a current threshold.

4. The controller of claim 1 further configured for determining the power demanded by the propulsion system for operating the thruster by applying the control operation, and for determining the adjusted control operation for the propulsion system by selectively limiting the operational power characteristic of the propulsion system if the power demanded by the propulsion system is above a power threshold.

5. The controller according to claim 1, further comprising applying the adjusted control operation for the propulsion system characteristic of the propulsion system determined based on the position of the vessel relative to the target position when the property of the riser determined by the controller is within an associated threshold or operational limit and when the power demanded by the propulsion system is above a power threshold.

6. The controller according to claim 1, wherein monitoring the property of at least part of the riser extending from the vessel comprises monitoring one or more of: an angle, orientation, inclination, bending, flex, stress or strain of at least part or all of the riser.

7. The controller according to claim 1, wherein the property of the riser is measured by a plurality of control sensors comprising at least two control sensors that are duplicates of each other and the controller is configured to select the control operation or the adjusted control operation for the thrusters on the basis of signals from the at least two control sensors.

8. The controller according to claim 1, configured such that, when the property of the riser is out with a threshold or operational range, then the controller controls the propulsion system according to the control operation for the thrusters without the adjustment or limiting of the propulsion system.

9. The controller according to claim 1, wherein the adjusted control operation of the propulsion system is time dependent.

10. The controller according to claim 1, wherein the power characteristic comprises a power demanded or a rate of increase in power demanded by the propulsion system.

11. The controller according to claim 1 configured to automatically disconnect the riser, and/or provide an alert to an operator to disconnect the riser, if the monitored one or more properties of the riser exceeds a disconnection threshold.

12. The controller according to claim 1, wherein the position of the vessel is at least partially determined using variations in tension in a taut line fixed at one end to a stationary point.

13. The controller according to claim 1, configured such that operation of the thruster by applying the adjusted control operation can be manually overridden, switched off or cancelled.

14. The controller according to claim 1, being configured to override or modify control of a dynamic positioning system by a dynamic positioning system controller.

15. The controller according to claim 14, wherein the dynamic positioning system controller is configured to determine the position of the vessel relative to the target position and to determine a control the propulsion system of the vessel based on the determined position of the vessel relative to the target position and the drive-off prevention controller is configured to monitor the property of at least the part of the riser, and to apply the adjusted control operation for the propulsion system determined by the dynamic positioning system controller according to the monitored property of the riser.

16. The controller of claim 1 and being configured to determine at least two properties of the riser from data supplied from at least two control sensors, wherein the controller is configured for operating the thruster by applying the adjusted control operation with the limitation of the power characteristic when one of the at least two properties indicates operation without the operational range.

17. The controller of claim 1, wherein the threshold less than the power characteristic of the control operation comprises at least one of at least one of: a power demand or a rate of increase in power demand of the propulsion system; power consumed by the propulsion system; a rate of increase in the power consumed by the system, power output by the propulsion system, or a rate of increase in power output by the propulsion system.

18. A method for dynamically positioning a vessel having a riser extending towards seabed and a plurality of control sensors configured for monitoring riser properties, the method comprising:
determining a position of the vessel,
determining a difference between the determined position and a target position,
determining a control operation for thrusters, the control operation having a power characteristic being dependent on the determined difference,
determining an adjusted control operation for the thrusters, wherein the adjusted control operation implements a limiting procedure of the power characteristic to below a threshold less than the power characteristic of the control operation,
determining one or more properties of the riser from data supplied by the plurality of control sensors,
determining whether the one or more determined properties of the riser is within an operational range, the operational range comprising a maximum value of the one or more determined properties at which riser disconnection can occur,
operating the thruster by applying the control operation when the one or more determined properties of the riser are out of the operational range, and
operating the thruster by applying the adjusted control operation when the one or more determined properties of the riser are within the operational range.

19. The method of claim 18, wherein the threshold less than the power characteristic of the control operation comprises at least one of at least one of: a power demand or a rate of increase in power demand of the propulsion system; power consumed by the propulsion system; a rate of increase in the power consumed by the system, power output by the propulsion system, or a rate of increase in power output by the propulsion system.

20. A floating drilling vessel comprising:
a riser extending towards seabed,
at least one control sensor for monitoring at least one property of the riser,
a dynamic positioning system configured to determine a position of a vessel relative to a target position and to determine a control operation having a power characteristic being dependent on the difference between the determined position of the vessel relative to the target position, and
control a propulsion system of the vessel based on the control operation,
a drive-off prevention controller controlling the dynamic positioning system, and configured for:
determining the control operation for the thrusters, and
determining an adjusted control operation for the thrusters, wherein the adjusted control operation implements a limiting procedure of the power characteristic to below a threshold less than the power characteristic of the control operation,
determining one or more properties of the riser from data supplied by the at least one control sensor, and
determining whether the one or more properties of the riser is within an operational range, the operational range comprising a maximum value of the one or more properties at which riser disconnection can occur,
operating the thruster by applying the control operation, when the one or more properties of the riser are out of the operational range, and
operating the thruster by applying the adjusted control operation when the one or more properties of the riser are within the operational range.

21. The floating drilling vessel of claim 20, wherein the threshold less than the power characteristic of the control operation comprises at least one of at least one of: a power demand or a rate of increase in power demand of the propulsion system; power consumed by the propulsion system; a rate of increase in the power consumed by the system, power output by the propulsion system, or a rate of increase in power output by the propulsion system.

* * * * *